(12) United States Patent
Dufton et al.

(10) Patent No.: US 11,428,643 B2
(45) Date of Patent: Aug. 30, 2022

(54) ARTIFICIAL FAECES

(71) Applicant: The Procter & Gamble Company, Cincinnati, OH (US)

(72) Inventors: Tiffany Dufton, Newcastle upon Tyne (GB); Eva Eva Perez-Prat Vinuesa, Newcastle upon Tyne (GB); Laura Jane Caufield, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 617 days.

(21) Appl. No.: 16/525,633

(22) Filed: Jul. 30, 2019

(65) Prior Publication Data

US 2020/0041422 A1 Feb. 6, 2020

(30) Foreign Application Priority Data

Jul. 31, 2018 (EP) .................................. 18186722
Jun. 27, 2019 (EP) .................................. 19183038

(51) Int. Cl.
*C12Q 1/22* (2006.01)
*G01N 21/95* (2006.01)
*C11D 11/00* (2006.01)

(52) U.S. Cl.
CPC .......... *G01N 21/95* (2013.01); *C11D 11/0017* (2013.01)

(58) Field of Classification Search
CPC ....... G01N 21/95; C11D 11/0017; C12Q 1/22
See application file for complete search history.

(56) References Cited

U.S. PATENT DOCUMENTS

| 5,356,626 A | 10/1994 | Yeo | |
|---|---|---|---|
| 7,744,531 B2 * | 6/2010 | Marsh | ..................... A61Q 19/10 |
| | | | 600/300 |
| 2006/0204597 A1 * | 9/2006 | Bird | ........................ A61P 29/00 |
| | | | 424/750 |
| 2011/0236895 A1 | 9/2011 | Tanigami | |
| 2011/0278500 A1 | 11/2011 | Bergeron | |
| 2012/0252042 A1 | 10/2012 | Qin | |
| 2019/0226141 A1 * | 7/2019 | Aydin | .................... C08K 3/013 |

FOREIGN PATENT DOCUMENTS

| DE | 102007027596 A | 1/2009 |
|---|---|---|
| FR | 2444693 A | 7/1980 |
| WO | WO9429385 A1 | 12/1994 |
| WO | WO2018038670 A1 | 3/2018 |

OTHER PUBLICATIONS

Extended European Search Report and Search Opinion; Application Ser. No. 19183038.9; dated Jan. 15, 2020; 5 pages.
EP Search Report for appl. No 18186722.7—1102, dated Mar. 26, 2019, 7 pages.

* cited by examiner

*Primary Examiner* — Jae N Noh

(57) ABSTRACT

An artificial faecal composition including: i) simulated digested-food matter, and ii) an n-acetylated polysaccharide.

18 Claims, No Drawings

ARTIFICIAL FAECES

FIELD OF THE INVENTION

This disclosure relates generally to compositions suitable for use as artificial faeces.

BACKGROUND OF THE INVENTION

Sometimes it is desirable to understand the chemical and/or physical behaviour of faeces. For example, it may be desirable to investigate how to remove faeces from fabrics. Investigators engaged in such work would generally prefer not to use real faeces in experiments. Real faeces, whether human or animal, may be capable of transmitting diseases. Further, the smell of some faeces samples, cultural norms, and other factors may make handling faeces repugnant even when it is handled in a manner which minimizes the risk of disease transmission.

Some artificial faeces alternatives have been proposed, and even sold commercially. However, when these artificial faeces are used experimentally, the results may be inconsistent with experiments run with real faeces, qualitatively or quantitatively. The value of the work done with such artificial faeces may be reduced, because it remains uncertain whether the results of the study will be applicable to real faeces. Further, as a biological product, real faeces are not consistent substances. However, most artificial faeces formulas are targeted to a single "type" of faeces, and still only mimic a handful of the aspects of that faeces type.

Faeces becomes strongly attached to fabrics. The artificial faeces of the prior art do not seem to provide the same soiling and attachment to fabrics as real faeces.

WO2012/135567 relates to a composition useful for simulating faeces.

WO94/29385 relates to a synthetic faecal material that is a viscoelastic analogue which simulates natural faeces, particularly that excreted by young infants.

U.S. Pat. No. 5,356,626 relates to a synthetic faecal fluid composition which is useful with respect to the development of personal care devices such as diaper, training pants and incontinence garments which serve to collect and contain faecal matter.

However, the faecal stains from the prior art seem to wash out more easily than real faeces, they do not seem to be a true representation of natural faeces.

There remains a need for artificial faeces to study the removal of faeces from fabrics in a laundry process.

SUMMARY OF THE INVENTION

According to the first aspect of the invention, there is provided a method of assessing cleaning of a fabric comprising a faecal stain using an artificial faecal composition. The composition is a good representation of real faeces. The substantivity of the composition of the invention to fabrics is representative of the substantivity presented by real faeces. Substantivity herein refers to the attachment of the composition to the fabric. The composition comprises simulated digested-food matter and an n-acetylated polysaccharide. The method is reproducible and consistent.

DETAILED DESCRIPTION OF THE INVENTION

The artificial faecal composition is useful, for example, in studying cleaning and soil removal from fabrics, without the risk of disease transmission associated with handling real faeces.

By "artificial composition" is herein meant a composition prepared by a human or a machine, i.e., not a natural occurring composition. The "artificial faecal composition" used in the method of the invention is sometimes referred to as "artificial faeces" or "the composition of the invention".

Simulated Digested-Food Matter

The artificial faecal composition comprises simulated digested-food matter, preferably from about 5% to about 40%, more preferably from about 5% to about 20% and especially from about 8 to about 15% by weight of the composition. By "simulated digested-food matter" is herein understood mater that simulates matter that is eaten and digested by humans, preferably the digested-food matter comprises dried vegetable(s), fiber, yeast, yeast derivatives, proteins and/or fatty acids. Preferably, the simulated digested-food matter comprises dried vegetable(s), fiber, yeast, yeast derivatives, and fatty acids.

The artificial faecal composition preferably comprises dried vegetables. Suitable vegetables include, but are not limited to, tomato, spinach, cabbage, okra, white (button) mushroom, carrot, pumpkin, and combinations thereof. The vegetable, or the predominant vegetable, if multiple vegetables are used, may be selected based on the intended use of the artificial faeces. For example, the vegetables may fluoresce at different wavelengths of visible light with different intensities. For example, white mushroom, carrot, tomato, pumpkin, spinach, and cabbage powders are all visible as red fluorescence under green light. However, white mushroom, cabbage, carrot, and pumpkin may have more intense (and therefore more easily visible) fluoresce than tomato and spinach. In contrast, tomato, cabbage, and spinach provide bright green fluorescence under red light, and carrot provides a bright blue fluorescence under blue light. Under black light, white mushroom, tomato, carrot, cabbage, and pumpkin powders are easily visible, but spinach is harder to see with the unaided eye. Thus, the vegetable or the proportions of various vegetables in the artificial faeces may be selected such that the artificial faeces can be viewed under a specific lighting condition. The total vegetable content of the artificial faeces may be from about 10% to about 50%, preferably from 15% to 35% by weight of the organic edible matter.

The vegetable or predominant vegetable may also be selected for relative content of Adenosine Triphosphate (ATP). ATP is a compound ubiquitous in living things, however, not all living things produce like quantities of ATP. The following processed food products are listed in decreasing order of typical ATP content: Tomato, peaches, sweet peas, beef, spinach powder, ham, cabbage, pumpkin, and carrot. If the artificial faeces comprises ATP, it may be possible to track residues on a test surface using ATP quantification. For example, the artificial faeces may be tested in advance for ATP content, in a known quantity of artificial faeces applied to a test surface. The surface may then be cleaned or rinsed, and the surface tested for ATP. The quantity of ATP on the surface may be directly attributed to the artificial faeces, for example, if the test surface is an inanimate object. Relative amounts of ATP may be used to infer the amount of artificial faeces on animate surfaces, such as living skin.

The artificial faeces preferably comprises a source of fiber. Exemplary sources of fiber include, but are not limited to, *psyllium* husks, processed foods, a-cellulose, cellulose derivatives including methyl-cellulose, corn starch, and combinations thereof. If processed foods are used, the food product may be selected for high fiber content. The food product may be, for example, ground, boiled, diced, shredded, lyophilized, sieved, suspended (as in a liquid) or combinations thereof. If a processed food is used, alone or in combination with other materials, as the fiber source, the food may be selected for high fiber content, such as greater than 0.5 grams of fiber per tablespoon, or greater than 1.0 grams of fiber per ounce. Exemplary foods which may have a relatively high fiber content include raspberries, pears (including the skin), apples (including the skin), strawberries, bananas, oranges, dried figs, raisins, whole wheat pasta, pearled barley, bran flakes, oat bran, oatmeal, popcorn (popped), brown rice, rye bread, whole wheat bread, multigrain bread, sweet peas, lentils, black beans, lima beans, sunflower seed kernels (i.e., shelled sunflower seeds), almonds, pistachio nuts (i.e., shelled pistachios), pecans (i.e, shelled pecans), artichokes, broccoli, turnip greens, sweet corn, Brussel sprouts, potatoes (including the skin), tomato paste, raw carrots, or combinations thereof. The fiber may provide bulk and water retention to the artificial faeces. Less fiber may give artificial faeces with less cohesion than artificial faeces with relatively more fiber. Preferably, the digested-food matter comprises about 0.25% to about 2%, more preferably from about 0.3 to about 1% by weight of the organic edible matter of fiber.

The artificial faecal composition preferably comprises yeast and/or yeast derivatives, such as hydrolyzed yeast autolysates. The yeast, if present, may be an additional source of ATP and contribute bulk to the artificial faeces. Yeast products (whole cells and cell walls) may also provide proteins, polysaccharides, and other compounds which represent components of microbial origin in faeces. Without wishing to be bound by theory, these elements may influence the surface chemistry, surface energy, and/or rheology of the artificial faeces, and may, therefore, contribute to realistic "behavior" or characteristics. The yeast, if present, may be about 30% to about 80%, preferably from about 40% to 60% by weight of the digested-food matter. Food grade yeast products may be used to represent proteins and microbial particles common in human faeces. Live or inactivated yeast may be used, however, inactive yeast may produce a more stable intermediate product (i.e., during preparation), since the inactive yeast will not have on-going metabolic processes that might change ATP or protein content during processing.

The artificial faecal composition preferably comprises a source of proteins such as eggs. The level of the source of protein is preferably from about 1% to about 10% by weight of the faecal composition. Preferably from about 2% to 8% by weight of the composition.

The artificial faecal composition preferably comprises a fatty acid and/or fatty acid soaps. If the artificial faeces are used to simulate real faeces, fatty acids typically found in the faeces may be used. The fatty acid may comprise palmitic acid, calcium-stearate, lauric acid, myristic acid, stearic acid, arachidic acid, behenic acid, lignoceric acid, cerotic acid, and combinations thereof. Sources of fatty acids may be used, including, but not limited to, cooking (vegetable) oil, Coffee Mate™ coffee creamer products, cream cheese, butter, peanut butter, ground sesame seed powder, and combinations thereof. If present, the fatty acid and/or fatty acid soap may be about 2% to about 50%, or about 15% to about 30% by weight of the digested-food matter. The inclusion of one or more short chain fatty acids, having an aliphatic tail of less than six carbon atoms, may be used to enhance the realism of the artificial faeces, as short chain fatty acids are a contributor to the odors associated with real faeces. Other odorous compounds, or mixtures of fatty acids and/or other odorous compounds, can also be used, including, but not limited to, sulfur-containing compounds (such as hydrogen sulfide), nitrogen-containing compounds (such as amines), and certain aldehydes, ketones, alcohols, or any other compound having an unpleasant odor.

The components of the simulated digested-food matter may be ground into small particles. For example, the vegetable matter, fiber, and/or the yeast may be ground and sieved such that the nominal particle size is between about 100 and 500 microns, or between about 200 and 400 microns, or between about 250-300 microns. The vegetable, fibre, and/or yeast components may be sieved such that only particles which pass through a 300 micron sieve are used. If the solids are purchased as powders, it may be unnecessary to grind them, but may still be desirable to sieve them. Sieving the powders may contribute to more consistency across different batches of artificial faeces. Smaller particles may make for a smoother composition, which may be suitable for mimicking, for example, the faeces of a human infant. Larger particles or even small dices of dried vegetables may be used to simulate the faeces of older people, such as children or adults. Of course, a mix of particle sizes and morphologies, up to and including small cubes or chunks, could be used. If powdered or pre-ground products are purchased, attention should be paid to any additives. Anti-caking agents, such as $SiO_2$, may vary between products or between lots or batches of the same product, and can cause variation in the artificial faeces. The content and/or consistency of the vegetable additives may be easier to control by purchasing dried vegetables whole, or in pieces or large dices, and grinding the vegetables just prior to use.

N-Acetylated Polysaccharide

The n-acetylated polysaccharide contributes to the formation of a sticky biofilm similar to that found in natural occurring faecal compositions. Preferably, the composition comprises from about 0.5% to about 10%, more preferably from about 1% to about 5% by weight of the composition of an N-acetylated polysaccharide.

The preferred N-acetylated polysaccharide for use in the composition of the invention is chitosan. Chitin is the main constituent in the shells of crustaceans and is the most abundant naturally occurring biopolymer other than cellulose. Chitosan is derived from chitin and can be formed by deacetylation of chitin. Chitosan is commercially available in a wide variety of molecular weights (e.g., 10-1,000 kDa) and deacetylation degrees.

Preferred for use herein is chitosan having a degree of deacetylation of from about 50 to about 99%, preferably from about 60 to about 95%, more preferably from about 75% to about 90%. Preferably, the chitosan has a molecular weight of from about 10,000 to about 500,000, more preferably from about 20,000 to about 400,000 Da and specially from about 30,000 to about 200,000 Da (based on viscosity). Chitosan having a molecular weight of from about 30,000 to about 200,000 Da and a degree of deacetylation of from about 75% to about 90% have been found to give rise to biofilm similar to that found in natural occurring faeces.

Preferably, the composition of the invention comprises from about 1% to about 5% by weight of the composition of chitosan having a molecular weight of from about 30,000 to about 200,000 Da and a degree of deacetylation of from about 75% to about 90%.

Artificial Mucus

The composition of the invention preferably comprises artificial mucus. The artificial mucus contributes to the stickiness of the composition. The composition presents a similar stickiness to real occurring faeces with respect to fabric sustantivity.

Preferably the artificial mucus comprises mucin from pig stomach mucosa. The artificial mucus can include other materials, such as glycerol, egg white (fresh or dried), glycoproteins, polyacrylamides, polyvinylpyrrolidones, cellulose derivatives including methyl-cellulose and ethyl-cellulose, natural gums including gellan gum, polysaccharides, plants or plant exacts including okra, animal mucin including pig stomach mucin, combinations thereof, or other materials with similar adhesive and rheological properties. The mucus material, if present, may comprise between about 0.1% and about 10%, more preferably between 0.5% and 5% by weight of the composition of artificial mucus.

Source of Extra Cellular DNA

The artificial mucus preferably comprises a source of extra cellular DNA. Preferably, the source of extra cellular DNA is selected from the group consisting of DNA from Salmon Testes, DNA from Herring Testes and DNA from *Micrococcus luteus*. The source of extra cellular DNA can be added as part of the artificial mucus and/or separately. The source of extra cellular DNA, if present, may comprise between about 0.001% and about 5%, more preferably between 0.01% and 1% by weight of the composition of a source of extra cellular DNA.

Pigment

The composition of the invention preferably comprises a pigment. A pigment may be added to make the artificial faeces look like real faeces. It is to be appreciated that pigments that are responsible for the color of real faeces may be added to the artificial faeces. For example, stercobilin, a pigment found in real faeces, may be used. Preferably, the composition of the invention comprises stercobilin. Bat fertilizer can be used as a source of stercobilin. Dyes may be added to make the artificial faeces look less like real faeces and behave as real faeces in terms of soiling and cleaning from fabrics. For example, non-limiting dyes which might be used in an artificial faeces composition include food grade dyes, fluorescent dyes, water tracers (EPA-approved fluorescent dyes), colored or fluorescent beads (such as those commercially available as Glo-germ™ from DMA International, or Molecular Probes™ from Invitrogen), fluorescent tagged proteins, fluorescent tagged microbial particles, colored fruits and vegetables (such as beets, blueberries, or ground parsley flakes), similar colored or fluorescent materials, and combinations thereof Water and Other Additives The artificial faeces may comprise a liquid component. The liquid component may be predominantly water. Preferably, the composition comprises from about 20% to about 60%, more preferably from about 40% to about 55% by weight of the composition of water. If surface interactions and/or surface energy are of interest, deionized water may be used. Surfactants or other additives may also be used to vary the surface tension and/or surface energy of the artificial faeces. The liquid component may comprise one or more preservatives, to reduce microbial growth in the artificial faeces and enable a longer usage-life. Citric acid, which naturally arises in most animal faeces both from food sources and as a by-product of the Krebs cycle, may be added to the artificial faecal composition. If added the citric acid is present in a level of from about 1% to 10% by weight of the composition. Other acids, such as, phosphoric acid, acetic acid (vinegar), ascorbic acid, malic acid, oxalic acid, salicylic acid, organic acids, and combinations thereof may be used instead of or in addition to citric acid. It may be desirable to use one or more acids naturally present in foods, including fruits, vegetables, and drinks, such as soda and sports drinks. Fruit juices, soda, and vegetable drinks may also be used as acid sources. It may be desirable to adjust the pH until the artificial faeces is inhospitable to many microorganisms; a pH of less than 5, or approximately 4.6, has been found useful for this purpose. An acid, if used, may be present at a Molarity (moles/Liter) between $5\times10^{-3}$ and $9\times10^{-3}$. Of course, depending upon the formula, including any basic (alkaline) ingredients, the pKa of the acid being used, and the desired pH of the artificial faeces, the desired Molarity of the acid or acids may vary within or outside this exemplary range. The liquid component may comprise benzyl alcohol. Benzyl alcohol is a naturally occurring substance in many plants, and may help inhibit microbial growth in the artificial faeces between the time it is prepared and the time it is used. The artificial faeces may comprise sodium benzoate. Sodium benzoate also occurs at low levels in dietary plants, and may help inhibit microbial growth in the artificial faeces. In addition to, or instead of, benzyl alcohol and/or sodium benzoate, potassium sorbate, sorbic acid, or combinations thereof may be used. The primary purpose of the citric acid, benzyl alcohol, and/or sodium benzoate is to reduce microbial growth in the artificial faeces; other preservatives or anti-microbials could be substituted for these compounds. Citric acid, benzyl alcohol, and/or sodium benzoate provide a preservative mixture which may be useful, for example, when the artificial faeces may come in contact with human skin, because the compounds are naturally occurring, non-toxic, and at suitable concentrations, generally non-irritating. Substitute preservatives may be selected for similar properties, if desired. One or more acids may be desirable as a preservative or as a component of a preservative system because acids may lower the pH of the artificial faeces, which both inhibits some microbial growth and helps preserve ATP in the triphosphate structure (i.e., maintain ATP counts over time).

Fragrances might be used in an artificial faecal composition. Like fragrances may signal that the composition is not real faeces. Non-limiting fragrances which might be used in an artificial faeces composition include essential oils (botanically-derived or synthetic), industrial perfumes or odour products, vegetable smells (synthetic or natural, including asparagus, bacon, peanuts, cheese, or combinations of these). In addition, the vegetable matter may be modified to include pleasant-smelling components, such as dried rosemary, dried sage, other dried herbs, dried flowers, or combinations thereof. Some people, however, may find pleasantly-scented artificial feces disconcerting, particularly if the artificial faecal composition still looks very similar to real faeces.

Method of Assessing Cleaning of a Fabric

The method of the invention comprises the steps of:
i) applying a determined amount of the artificial faecal composition to a fabric;
ii) washing the fabric;
iii) evaluating the removal of the composition from the fabric.

For the purpose of the present invention, washing includes but is not limited to, scrubbing, and mechanical agitation. It can be hand washing or machine washing. The fabric may comprise any fabric capable of being laundered or treated in normal consumer use conditions. Liquors that may comprise a cleaning composition are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1.

EXAMPLE

Stain removal from fabrics stained with artificial faecal stains was measured.

The test was carried out using professional washing machines (Electrolux W565H) and 5 kg of dry fabric load. The wash cycle had a 30° C. prewash followed by a 60° C. main wash and included extra soil via 10SBL sheets. Water hardness was 15 gpg. 14 ml Ariel liquid detergent was added to the prewash, and 35 ml Ariel liquid detergent was added to the main wash along with 14 ml liquid PAP bleach.

The stain fabrics were graded using a Hunter Colorquest Spectrophotometer to determine the removal of the stains by measuring the amount of stain that is left after washing, compared to the initial unwashed set. The results of the stain removal data were averaged across two to four replicates of the stain to give the overall stain removal index (SRI) grade vs. the reference product. The response was measured at 460 nm and used to calculate the soil removal delta in % (DSR) according to formula below:

$$DSR = \frac{R_{before} - R_{after}}{R_{before} - R_{clean}} \times 100\%$$

$R_{before}$ = Remission before washing $R_{after}$ = Remission after washing $R_{clean}$ = Remission from clean white cotton Method of Stain Application Using a 5 cm circle template, 1g of stain mixture was applied to desized knitted cotton (obtained from Equest). The stain was allowed to dry overnight.

The Artificial Bowel Movement (ABM) composition exemplified in EP 2 691 769 B1 is showed in Table 1.

| Ingredient | Weight (g) |
|---|---|
| Tomato (grinded, <300 microns) | 20.06 |
| Spinach (grinded, <300 microns) | 8.13 |
| Cabbage (grinded, <300 microns) | 2.14 |
| Whole Psyllium Husk (grinded, <300 microns) | 0.60 |
| Palmitic Acid/Calcium Stearate (2:1) (grinded, <300 microns) | 20.83 |
| OHLY Provesta 000 | 40.91 |
| OHLY Auxoferm HCT | 16.63 |

The ABM composition of Table 1 was made into two paste-like compositions by mixing it with the ingredients shown in Table 2.

| Ingredient | Ref ABM stain (%) | Composition 1 (%) | Composition 2 (%) |
|---|---|---|---|
| ABM | 33 | 14.4 | 14.1 |
| Hard water | 67 | 62.3 | 61.3 |
| Liquid bat fertiliser | | 7.2 | 7.1 |
| Egg | | 5.4 | 5.3 |
| Lard | | 3.6 | 3.5 |
| Yeast | | 7.2 | 7.1 |
| Chitosan | | 0 | 1.6 |

Liquid bat fertilizer from www.guanokalong.nl
Egg—fresh mixed
Lard—Asda smartprice lard
Yeast—Allinson dried active yeast
Chitosan—low molecular weight Chitosan from Sigma Aldrich (Code 448869)

The stained fabrics were washed in a machine as detailed above and the stain removal index was measured via image analysis with the following result:

| | SRI |
|---|---|
| Ref ABM stain | 91.8 |
| ABM + bat fertilizer + egg + lard + yeast - Composition 1 | 86.2 |
| ABM + bat fertilizer + egg + lard + yeast + chitosan - Composition 2 | 80.6 |

This shows that the faecal stains comprising chitosan are much more residual than faecal stains free of chitosan.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of assessing cleaning of a fabric comprising a faecal stain, the method comprising the steps of:
    a) applying a determined amount of an artificial faecal composition comprising:
        i) simulated digested-food matter; and
        ii) an n-acetylated polysaccharide
    b) washing the fabric; and
    c) evaluating the removal of the composition from the fabric.

2. A method according to claim 1 wherein the polysaccharide comprises chitosan.

3. A method according to claim 1 wherein the polysaccharide comprises chitosan wherein the chitosan has a degree of deacetylation of from about 50 to about 99%.

4. A method according to claim 1 wherein the polysaccharide comprises chitosan wherein the chitosan has a degree of deacetylation of from about 60 to about 95%.

5. A method according to claim 1 wherein the polysaccharide comprises chitosan wherein the chitosan has a molecular weight of from about 10,000 to about 500,000.

6. A method according to claim 1 wherein the polysaccharide comprises chitosan wherein the chitosan has a molecular weight of from about 20,000 to about 400,000 Da.

7. A method according to claim 1 wherein the polysaccharide comprises chitosan wherein the chitosan has a degree of deacetylation of from about 70 to about 90% and a molecular weight of from about 30,000 to about 200,000 Da.

8. A method according to claim 1 wherein the composition comprises a source of extra cellular DNA.

9. A method according to claim 1 wherein the composition comprises a source of extra cellular DNA selected from the group consisting of DNA from Salmon Testes, DNA from Herring Testes and DNA from *Micrococcus luteus*.

10. A method according to claim 1 wherein the simulated digested-food matter comprises ingredients selected from the group consisting of:
   a. one or more dried vegetable(s);
   b. fiber;
   c. yeast or yeast derivatives;
   d. a fatty acid;
   e. proteins; and
   f. a mixture thereof.

11. A method according to the claim 1 wherein the simulated digested-food matter comprises one or more dried vegetable(s), fiber, yeast or yeast derivative and/or a mixture thereof and wherein the one or more dried vegetable(s), fiber, yeast or yeast derivative and/or a mixture thereof are grounded and preferably have a nominal particle size between about 100 and 500 microns.

12. A method according to claim 1 wherein the composition further comprises a pigment and/or a dye, preferably a pigment comprising stercobilin.

13. A method according to claim 1 wherein the composition further comprises a pigment comprising stercobilin.

14. A method according to claim 1 wherein the composition further comprises artificial mucus.

15. A method according to claim 1 wherein the composition comprises:
   a. simulated digested-food matter preferably selected from the group consisting of:
      i) one or more dried vegetable;
      ii) fiber;
      iii) yeast or yeast derivatives;
      iv) a fatty acid;
      v) proteins; and
      vi) a mixture thereof;
   b. chitosan having a degree of deacetylation of from about 70% to about 90% and a molecular weight of from about 30,000 to about 200,000 Da;
   c. a source of extra cellular DNA
   d. artificial mucus;
   e. a pigment; and
   f. water.

16. A method according to claim 1 wherein the composition comprises:
   a. from about 10% to about 40% by weight of the composition of simulated digested-food matter preferably selected from the group consisting of:
      i) one or more dried vegetable;
      ii) fiber;
      iii) yeast or yeast derivatives;
      iv) a fatty acid;
      v) proteins; and
      vi) a mixture thereof;
   b. from about 1% to about 5% by weight thereof of chitosan having a degree of deacetylation of from about 70 to about 90% and a molecular weight of from about 30,000 to about 200,000 Da;
   c. a source of extra cellular DNA selected from the group consisting of DNA from Salmon Testes, DNA from Herring Testes and DNA from *Micrococcus luteus;*
   d. artificial mucus;
   e. stercobilin; and
   f. from about 10% to about 80% by weight of the composition of water.

17. A method according to claim 1 wherein the washing of the fabric takes place in a domestic or commercial washing machine.

18. A method according to claim 1 wherein evaluating the removal of the composition from the fabric is performed by means of image analysis.

* * * * *